United States Patent
McCullough

[15] 3,656,304
[45] Apr. 18, 1972

[54] ROCKET MOTOR
[72] Inventor: Edward E. McCullough, Brigham City, Utah
[73] Assignee: Thiokol Chemical Corporation, Bristol, Pa.
[22] Filed: July 19, 1966
[21] Appl. No.: 566,330

[52] U.S. Cl................................60/254, 60/256, 102/49.8, 102/49.7, 102/70.2, 102/100
[51] Int. Cl.............................................F02k 9/04
[58] Field of Search..................60/207, 220, 225, 234, 250, 60/251, 254, 256; 102/49.8, 100

[56] References Cited

UNITED STATES PATENTS

| 3,248,875 | 5/1966 | Wolcott | 60/254 |
| 3,286,471 | 11/1966 | Kaplan | 60/254 |
| 3,293,855 | 12/1966 | Cuttill et al. | 60/229 |

Primary Examiner—Samuel Feinberg
Attorney—Thomas W. Brennan

EXEMPLARY CLAIM

1. A rocket motor comprising:

a motor case having a thrust nozzle mounted on the aft end thereof;

a plurality of oxygen-rich solid propellant grains tandemly disposed within said motor case;

a plurality of baffles respectively disposed between adjacent end surfaces of said oxygen-rich grains, each of said baffles being formed of a heat-resistant material so that each of said grains can be burned without igniting the adjacent one of said grains forward thereof, and each of said baffles being removable by gas generated by combustion of the adjacent one of said grains forward thereof;

at least one oxygen-deficient solid propellant grain disposed within said motor case between said thrust nozzle and the rearmost of said oxygen-rich grains, said oxygen-deficient grain being formed with at least one longutidinally-extending perforation that communicates with said thrust nozzle and said rearmost oxygen-rich grain; and igniting means for igniting each of said oxygen-rich grains.

5 Claims, 3 Drawing Figures

PATENTED APR 18 1972

3,656,304

INVENTOR.
EDWARD E. McCULLOUGH

BY Edwin D. Grant

ATTORNEY

ROCKET MOTOR

This invention relates to rocket motors and more particularly to a solid propellant rocket motor that can be operated intermittently.

Although solid propellant rocket motors possess many advantages, including simplicity, high propellant mass fraction, and high density impulse, they have heretofore been limited with respect to their ability to be operated intermittently, i.e., started, stopped, and restarted. However, in accordance with the principles of this invention, there is provided an uncomplicated solid propellant rocket motor that can be operated intermittently. More particularly, a rocket motor in accordance with the invention has at least one longitudinally-perforated solid propellant grain that is lacking or deficient in oxygen and a plurality of solid propellant grains that contain an excess of oxygen, these oxygen-rich grains being tandemly disposed within the forward portion of the motor casing of the rocket motor and separated by baffles so as to be capable of independent firing. The composition of the oxygen-deficient grain is such that it will burn only when one of the oxygen-rich grains is burning, the combustion gases of the latter, which contain an excess of oxygen, being directed into the longitudinally-extending perforation formed in the oxygen-deficient grain. Thus the oxygen-rich grains can be ignited at selected intervals to provide different thrust programs for the rocket motor.

It is accordingly a broad object of this invention to provide an improved solid propellant rocket motor.

Another object of this invention is to provide an uncomplicated, lightweight solid propellant rocket motor that can be started, stopped and restarted to provide a desired thrust program.

An additional object of this invention is to provide an effective ignition system for igniting multiple solid propellant grains of a rocket motor in any time sequence.

Other objects and advantages of the present invention will become apparent in the following description of a preferred embodiment thereof, in which description reference is made to the accompanying drawings, wherein.

Throughout the specification and drawing, like reference numbers refer to like parts.

Figure 1:
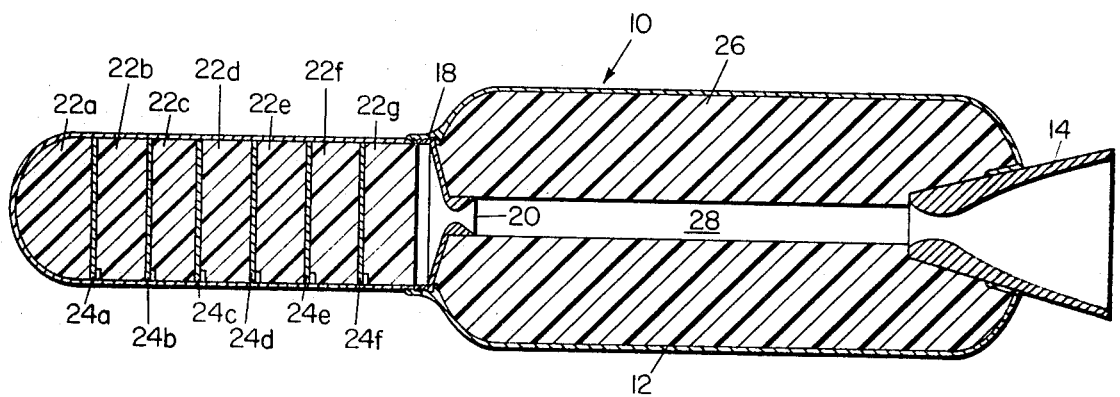
FIG. 1 is a longitudinal sectional view illustrating the preferred embodiment of the invention.

In FIG. 1 the number 10 generally designates a rocket motor comprising a motor case having a cylindrical rear section 12 on the aft end of which is fixedly mounted a submerged thrust nozzle 14 and on the forward end of which is coaxially mounted a cylindrical forward section 16. More specifically, the forward end of the rear section 12 of the rocket motor case is formed with an aperture 18 in which the aft end of the forward section 16 is threadedly engaged, the radially extending, forward edge portion of a nozzle 20 being fixedly held by the aft end surface of section 16 of the motor case against a circumferentially extending shoulder located at the rear edge of said aperture. A plurality of oxygen-rich solid propellant grains 22a through 22g are tandemly disposed within the forward section 16 of the rocket motor case, and a plurality of disk-shaped baffles 24a through 24f are disposed between adjacent end surfaces of said grains. Disposed within the rear section 12 of the rocket motor case is an oxygen-deficient solid propellant grain 26 through which extends a perforation 28. The aft end portion of nozzle 20 projects into the forward end of perforation 28, and thus the perforation communicates with the rearmost of the grains 22 as well as with the orifice of thrust nozzle 14.

Figure 2:
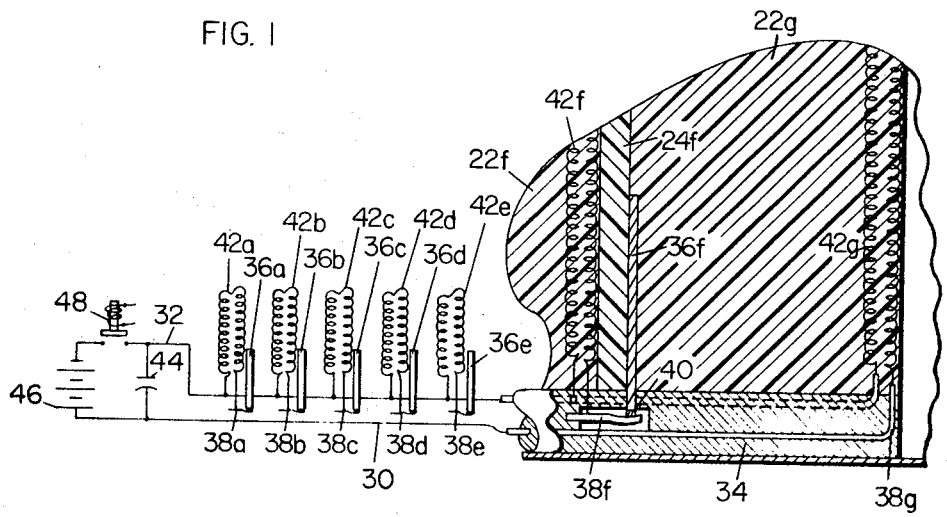
FIG. 2 is a schematic, fragmentary representation of certain components of the same embodiment.
Figure 3:
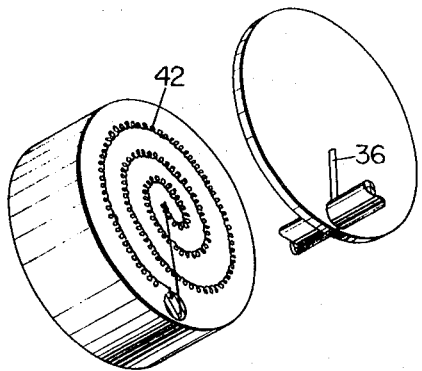
FIG. 3 is a pictorial representation of certain components of the same embodiment.

As illustrated in FIGS. 2 and 3, rocket motor 10 is provided with an ignition system for igniting each of the oxygen-rich grains at any predetermined time consecutively from the rearmost of said grains. This ignition system comprises a first electrical conductor 30 and a second electrical conductor 32 both of which are enclosed within a cylindrical housing 34 which abuts the inner surface of the forward section 16 of the the rocket motor case and extends longitudinally thereof. A plurality of rod-shaped, heat-conductive members 36a through 36f are disposed adjacent the aft surface of respective ones of the baffles 24, and a plurality of electrically conductive spring members 38a through 38f are spaced along housing 34 so that each of said spring members is positioned adjacent a respective one of the members 36 and also adjacent first conductor 30. More particularly, a portion of each of the spring members 38 is disposed within a respective one of a plurality of cavities formed in housing 34 and the remainder of each spring member is embedded in the housing. The free end of each spring member 34 is biased toward first conductor 30 and is restrained from contacting this conductor by a bead of solder 40, or other material having an appropriate melting point, that is positioned between the spring conductor and the adjacent member 36.

Each of a plurality of ignition wires 42a through 42g is embedded in a respective one of the oxygen-rich grains 22 adjacent the aft surface thereof, these ignition wires being coiled as illustrated in FIG. 3 or looped so as to contact a large portion of the aft ends of the grains. One end of each ignition wire 42a through 42f is electrically connected to second conductor 32 and the other end is electrically connected to a respective one of the spring members 38. As illustrated in FIG. 2, there is no spring member 38 at the aft end surface of grain 22g and the ends of conductors 30 and 32 are directly connected to the ends of ignition wire 42g. The forward ends of conductors 30 and 32 are connected to a capacitor 44 that can be connected to, or disconnected from, a battery 46 by means of a solenoid-operated switch 48 that can be actuated from a remote point.

As will be recognized by persons who are skilled in the art of rocket motors, the structural components of the preferred embodiment illustrated in FIG. 1 can be made of many different, well-known materials. The oxygen-rich grains 22 can consist of many different solid propellant compositions which contain an excess of oxygen and which, when burned, produce a gas containing a high percentage of uncombined oxygen. Likewise, the oxygen-deficient grain 26 can consist of any solid propellant composition which is incapable of supporting combustion without the supply of oxygen from a source other than the grain itself. In some embodiments of the invention, grain 26 advantageously can comprise both a fuel and an oxidizer interspersed in a suitable binder, whereas in other cases the grain can consist only of a fuel. Ignition wires 42 are formed of any material that will ignite when electric current is passed through the wires, for example, magnesium or one of the commercially available fuse wires. Baffles 24 are made of a material which has low thermal conductivity (so that each of the grains 22 can be completely burned without causing the grain forward thereof to ignite) and which will permit at least partial disintegration of each baffle when the grain forward thereof is ignited by its ignition wire 42. One example of a material suitable for the fabrication of baffles 24 is fiberglass impregnated with a heat-resistant resin.

When operation of rocket motor 10 is desired, switch 48 is actuated so as to connect conductor 32 to battery 46, whereupon electric current flows through the circuit formed by said conductor 32, ignition wire 42g, conductor 30, and said battery 46. Current flow through ignition wire 42g causes it to ignite, which in turn ignites grain 22g before the ignition wire has been consumed and the circuit broken. It will be recognized that the other grains 22 are not ignited at this time because their ignition wires 42 are not connected to conductor 30. Combustion of grain 22g produces an oxygen-rich, high-temperature gas that passes through nozzle 20 and ignites grain 26. The oxygen in the combustion gas of grain 22g supports combustion of grain 26, which, as has been pointed out hereinbefore, would not otherwise occur. If it is desired that the combustion of grain 26 terminate after grain 22g has been completely consumed, switch 48 is actuated to open the circuit after said grain 22g has been ignited and before the combustion flame front reaches baffle 24f. When the combustion flame front reaches baffle 24f, heat flow along member 36f melts the solder 40 between said member and spring member 38f. Since switch 48 has been opened, the resulting contact between spring member 38f and conductor 30 does not cause ignition of ignition wire 42f embedded in grain 22f. Thus grain 26 stops burning because it is no longer supplied with oxygen. However, rocket motor 10 can again be fired simply by closing switch 48 to complete the circuit consisting of conductor 32, ignition wire 42f, spring member 38f, conductor 30 and battery 46, whereupon baffle 24f is ruptured and grain 26 is again ignited and supplied with the oxygen necessary for its combustion. If it is desired that operation of rocket motor 10 continue without interruption after grain 22g has been consumed, switch 48 is not opened after said grain has been ignited, with the result that contact of spring member 38f with conductor initiates current flow through ignition wire 42f and effects ignition of grain 22f. The gas generated by combustion of grain 22f then ruptures baffle 24f and sustains the combustion of grain 26. Obviously further operation of rocket motor 10 can be controlled by either maintaining switch 48 in a closed position (to continue thrust) or opening said switch (to terminate thrust) before the combustion flame front of a particular grain nears the baffle 24 forward thereof. The capacitor 44 insures that an adequate current will flow in the ignition circuit each time the circuit is completed, even when battery 46 begins to lose its power. Also the battery 46 may be relatively small, since the only current required is a short pulse each time a spring member 38 closes the circuit. The circuit thus closed is immediately reopened by firing of the next ignition wire 42.

It will thus be seen that the invention provides an uncomplicated, lightweight solid propellant rocket motor that can be operated intermittently. In addition, the construction and arrangement of the illustrated embodiment of the invention makes it possible to disassemble the two sections 12 and 16 of the rocket motor case and to thereafter transport these sections separately, with the advantage that the solid propellant grain 26 in section 12 is insensitive to accidental ignition and thus can be conveniently handled. This arrangement of rocket motor 10 also makes it possible to wrap the cured propellant grain 26 with a filament winding to form a case directly on said grain. Another advantage of the described rocket motor is that its oxygen-deficient grain 26 is centrally-perforated and thus capable of producing more thrust than the end burning grains of previously proposed rocket motors designed for "on-off" operation. Furthermore, the wall of the aft section 12 of the motor case is insulated from combustion gases by the oxygen-deficient grain 26 disposed therein, eliminating the weight of insulation which is necessary to protect a casing where end-burning grains are utilized.

It will also be recognized that the invention lends itself to a great variety of configurations and to the use of different materials of construction. For example, both the oxygen-rich and oxygen-dificient grains 22 and 26 can be of widely different shapes and size. If desired, two ignition systems of the type described can be employed in the rocket motor to increase reliability of operation, and other changes of similar nature will be obvious to persons skilled in the art of rocket motors. The scope of the invention is therefore to be understood as being limited only by the terms of the appended claims.

What is claimed is:

1. A rocket motor comprising:
   a motor case having a thrust nozzle mounted on the aft end thereof;
   a plurality of oxygen-rich solid propellant grains tandemly disposed within said motor case;
   a plurality of baffles respectively disposed between adjacent end surfaces of said oxygen-rich grains, each of said baffles being formed of a heat-resistant material so that each of said grains can be burned without igniting the adjacent one of said grains forward thereof, and each of said baffles being removable by gas generated by combustion of the adjacent one of said grains forward thereof;
   at least one oxygen-deficient solid propellant grain disposed within said motor case between said thrust nozzle and the rearmost of said oxygen-rich grains, said oxygen-deficient grain being formed with at least one longitudinally-extending perforation that communicates with said thrust nozzle and said rearmost oxygen-rich grain; and
   igniting means for igniting each of said oxygen-rich grains.

2. A rocket motor as defined in claim 1 wherein said motor case comprises forward and aft sections which are in communication with each other, said oxygen-rich grains being disposed within said forward section and said oxygen-deficient grain being disposed within said aft section, said sections being separable to facilitate transport of said rocket motor.

3. A rocket motor as defined in claim 1 including a nozzle disposed between said rearmost oxygen-rich grain and said oxygen-deficient grain for directing gas generated by combustion of said oxygen-rich grains into said perforation in said oxygen-deficient grain.

4. A rocket motor as defined in claim 1 wherein said igniting means comprises:
   first and second electrical conductors extending longitudinally of said oxygen-rich grains;
   a plurality of heat-conductive members each disposed adjacent the aft surface of a respective one of said baffles;
   a plurality of spring members each disposed adjacent said first electrical conductor and bonded to a respective one of said heat-conductive members by a heat-releasable bond, said spring members being biased so as to move into contact with said first electrical conductor when said heat-conductive members are heated and said heat-releasable bonds are thereby broken;
   a plurality of ignition wires each disposed adjacent the aft surface of a respective one of said oxygen-rich grains, each of said ignition wires having one end electrically connected to said second electrical conductor and the other end electrically connected to a respective one of said spring members;
   a source of electric current; and
   means for connecting and disconnecting said source of electric current to said first and second electrical conductors at a predetermined time.

5. A rocket motor as defined in claim 2 wherein said source of electric current is a battery and including a capacitor connected across said first and second electrical lead wires.

* * * * *